(12) United States Patent
Thevoux-Chabuel

(10) Patent No.: US 7,663,968 B2
(45) Date of Patent: Feb. 16, 2010

(54) METHOD OF PROCESSING GEOLOGICAL DATA

(75) Inventor: Hugues Thevoux-Chabuel, Asker (NO)

(73) Assignee: Roxar Software Solutions AS, Oslo (NO)

( * ) Notice: Subject to any disclaimer, the term of this patent is extended or adjusted under 35 U.S.C. 154(b) by 443 days.

(21) Appl. No.: 11/729,768

(22) Filed: Mar. 28, 2007

(65) Prior Publication Data

US 2008/0239871 A1 Oct. 2, 2008

(51) Int. Cl.
*G01V 1/00* (2006.01)
*G01V 1/40* (2006.01)

(52) U.S. Cl. .................. 367/33; 367/25; 702/6
(58) Field of Classification Search .......... 367/25, 367/33; 702/6–8
See application file for complete search history.

(56) References Cited

U.S. PATENT DOCUMENTS

| | | | | |
|---|---|---|---|---|
| 5,311,951 A * | 5/1994 | Kyte et al. | | 175/40 |
| 7,546,209 B2 * | 6/2009 | Williams | | 702/9 |
| 2003/0154029 A1 | 8/2003 | Metrick | | |
| 2005/0171698 A1 * | 8/2005 | Sung et al. | | 702/9 |
| 2008/0306692 A1 * | 12/2008 | Singer et al. | | 702/11 |

FOREIGN PATENT DOCUMENTS

GB 2 383 146 6/2003

* cited by examiner

*Primary Examiner*—Jack W. Keith
*Assistant Examiner*—Krystine Saito
(74) *Attorney, Agent, or Firm*—Abelman, Frayne & Schwab

(57) ABSTRACT

There is provided a method of processing geological data during drilling of a borehole for improving accuracy of the geological data. The method includes a first step of determining from instrumentation (100) associated with a string (50) of drilling pipes a spatial trajectory of a borehole (20, 200) in a subterranean region. A second step of the method involves determining from the spatial trajectory one or more points (P1, P2, P3) with reference to the geological data whereat the trajectory changes direction in one or more layers of strata (F) of the subterranean region. A third step of the method involves subdividing an offset log generated by the instrumentation (100) in response to the one or more points (P1, P2, P3) to generate corresponding sections of offset log. A fourth step involves mutually comparing the subdivided sections of offset log to find a condition of best comparison therebetween and thereby generate one or more error terms (E). A fifth step involves, in response to the one or more error terms (E), updating the geological data to improve its accuracy. Beneficially, the method includes a sixth of repeating the second to fifth steps until the one or more error terms (E) are minimized. The method is relevant for a drilling rig (40) to enhance its drilling accuracy into the subterranean region.

8 Claims, 11 Drawing Sheets

METHOD OF PROCESSING GEOLOGICAL DATA

FIELD OF THE INVENTION

The present invention relates to methods of processing geological data, for example to improve borehole drilling accuracy. Moreover, the present invention also concerns software executable on computing hardware for executing such methods. Furthermore, the present invention also relates to apparatus which operable to implement such methods by executing such software products on computing hardware.

BACKGROUND TO THE INVENTION

Generation of accurate 2-dimensional and 3-dimensional geological maps is essential for contemporary oil exploration in order for personnel such as geologists to identify geological formations which are likely to yield quantities of oil and/or gas which are profitable to extract. Generation of such geological maps is implemented using seismic apparatus. Each seismic apparatus comprises one or more seismic transmitters and one or more seismic receivers; optionally, the one or more seismic transmitters are also operable to function as one or more seismic receivers. The one or more seismic transmitters are operable to generate seismic waves in a ground formation to be mapped. Reflections of the seismic waves at various rock interfaces present in the ground formation, caused by seismic wave propagation impedance mismatch thereat, are received at the one or more seismic receivers to generate received signals; the impedance mismatch results, for example, as a consequence to spatial variations in rock density at the interfaces. The signals are digitized to generate seismic data. Subsequently, the seismic data is then provided to computing hardware provided with appropriate data processing software to isolate from:

(a) amplitudes of seismic signals received at the one or more seismic receivers, and also (b) time of reception of the seismic signals, seismic components from specific regions of the aforesaid interfaces and thereby determine spatial positions within the map of the regions of the interfaces. The data processing software executes a series of one or more matrix computations in order to derive the geological maps, the computations often requiring considerable computation effort.

It is found in practice that such seismically-derived geological maps are not always entirely accurate on account of noise, ambiguity of reflected seismic components, faults in rock layers affecting seismic wave propagation therethrough or reflection thereat which contribute to cause inaccuracies. However, in contemporary oil exploration, well boreholes often need to be drilled with considerable accuracy, especially when such well boreholes include a first upper portion which is substantially vertical and a lower portion which is at least in part substantially horizontal and required to follow a specific layer of geological strata in which oil deposits are to be found. For example, it is not contemporarily uncommon to aim to drill boreholes substantially horizontally along a layer of strata which has a vertical height of 5 meters at an end of well borehole having a length of 10 km.

Improvements in contemporary directional drilling have allowed drillers to drill a well borehole in almost any orientation. The drillers are then confronted with a problem of navigating their well boreholes during drilling. As elucidated in the foregoing, oil is typically located in relative thin stratigraphic zones which represent a significant technical challenge for the aforesaid drillers to target precisely. Optionally, a driller is desirous to tap into a stratigraphic zone of interest with a well borehole that traverses inside the zone for an extended distance. For example, if a target zone has a true horizontal orientation, then the well borehole, when it penetrates into the zone, extends horizontal to remain within the zone.

Prior art only provides less accurate techniques for maintaining a well borehole inside an aforementioned target zone. The target zone is typically thousands of meters below the Earth's surface or ocean seabed and is, in many situations, only 3 to 10 meters thick. Furthermore, stratigraphic zones are typically inclined or dipped relative to a horizontal plane. Thus, the target zone is a difficult target in which to maintain the well borehole during drilling operations. A well borehole drilled pursuant to prior art techniques is susceptible to quickly exiting the zone because:

(a) the well borehole has a direction is not parallel to that of the zone; and (b) a spatial region occupied by the zone is not known with certainty in seismically-derived stratigraphic maps.

In a published U.S. Pat. No. 5,311,951 (Kyte & Meehan), drilling techniques are described which allow a well borehole to be drilled downwardly, horizontally and upwardly. There is also elucidated a method of navigating a borehole drillable by utilizing directional drilling techniques. When implementing the method, a direction in which a borehole is drilled is determined relative to a stratigraphic target zone. By so navigating the borehole, it is feasible for the borehole to enter the target zone and extend inside the target zone. In order to navigate the borehole, an offset log of the borehole is obtained during drilling. Correlation points along the borehole are selected, for example by manual intervention or inspection. At each correlation point, a true stratigraphic depth of the borehole is computed from the offset log. Thus, knowing the true stratigraphic depth of the borehole allows the location of the target zone relative to the borehole to be determined, wherein the direction that the next segment of the borehole during drilling of the borehole is determined. The aforesaid U.S. patent (Kyte & Meethan) is concerned with a 2-dimension trajectory of a subterranean borehole.

Expressed more generally, the published U.S. Pat. No. 5,311,851 defines a method of determining the location of a borehole relative to strata in the Earth, wherein the method comprises steps of:

(a) providing information from the borehole, for example an offset log, such that the information characterizes the strata; and (b) providing characterizing information of the strata from an offset location;

(c) comparing the characterizing information from the borehole relative to the characterizing information from the offset location to determine the location of the selected points along the borehole relative to the strata.

The method described in published U.S. Pat. No. 5,311,951 enables the borehole to be drilled with greater accuracy in respect of stratigraphic information. However, if the stratigraphic information is not accurate, the borehole cannot be drilled to an accuracy greater than that of the stratigraphic information. Such inaccuracy represents a technical problem which the present invention seeks to technically address. A conventional approach to improving stratigraphic information is to undertake more extensive seismographic measurements, for example from more surface locations; however, such measurements are subject to fundamental limitations in that ill-defined boundaries are not rendered better spatially defined in a stratigraphic map simply by collecting more seismic measurements confirming that the boundaries are ill-defined.

SUMMARY OF THE INVENTION

An object of the present invention is to provide a method of processing geological data which provides a more accurate and reliable representation of actual stratigraphic structure in a subterranean region.

Another object of the invention is to provide a method of more accurately navigating drilling of a well borehole in an actual stratigraphic structure by generating more accurate stratigraphic information representative of the stratigraphic structure.

According to a first aspect of the invention, there is provided a method of processing geological data during drilling of a borehole for improving an accuracy of the geological data, the method including steps:
(a) determining from instrumentation associated with one or more strings of drilling pipes one or more spatial trajectories of one or more boreholes in a subterranean region;
(b) determining from the one or more spatial trajectories one or more points (P1, P2, P3) with reference to the geological data whereat the one or more trajectories change direction in one or more layers of strata (F) of the subterranean region;
(c) subdividing one or more offsets log generated by the instrumentation in response to the one or more points (P1, P2, P3) to generate corresponding sections of offset log;
(d) mutually comparing the subdivided sections of offset log to find a condition of best comparison therebetween and thereby generate one or more error terms (E); and
(e) in response to the one or more error terms (E), updating the geological data to improve its accuracy.

The invention is of advantage in that the geological data is susceptible to being in accuracy iteratively as drilling of the borehole progresses into the subterranean region.

Optionally, the method includes an addition step after step (e) of repeating steps (b) to (e) until the one or more error terms (E) assume a minimum value therefore. The method thus seeks to minimize error in the geological data using the offset log as a primary reference of accuracy.

Optionally, in the method, step (b) is implemented using a TVT %-D representation or a TST %-D representation for determining positions of the one or more points whereat the one or more trajectories change direction. Using the parameters TVT %-D or TST %-D has been found to enable the one or more points (P1, P2, P3) to be most accurately determined, for example by visual inspection and/or by computer-based evaluation techniques.

Optionally, in the method, step (d) involves computing one or more correlations for determining a best comparison. Although correlation can be used, alternative approaches to implementing comparison of subdivided sections of log can alternatively be employed if desired.

Optionally, in the method, the one or more offset logs correspond along the trajectories at least one of:
(f) a gamma sensing log;
(g) a material sensing log indicative of composition of drilling mud and fragments generated by one or more drill bits during drilling of the one or more boreholes.

In (f) above, the gamma sensing log is beneficially indicative shale content present in strata and sedimentological events.

Optionally, in the method, the geographic data is at least one of: a 2-dimensional stratigraphic representation of the subterranean region, a 3-dimensional stratigraphic representation of the subterranean region. A 3-dimensional representation is of benefit when the boreholes not only bend from substantially vertical to substantially horizontal into a substantially horizontal plane but also change direction within the horizontal plane.

According to a second aspect of the invention, there is provided an apparatus operable to implement a method pursuant to the first aspect of the invention.

According to a third aspect of the invention, there is provided a software product stored on data carrier or susceptible to being communicated via a data-carrying signal, the software product being executable on computing hardware for implementing a method pursuant to the first aspect of the invention.

According to a fourth aspect of the invention, there is provided a drilling rig operable to implement a method pursuant to the first aspect of the invention, the method being operable to improve drilling accuracy of a borehole in respect of a geological target zone.

It will be appreciated that features of the invention are susceptible to being combined in any combination without departing from the scope of the invention as defined by the accompanying claims.

DESCRIPTION OF THE DIAGRAMS

Embodiments of the present invention will now be described, by way of example only, with reference to the accompanying drawings wherein.

DESCRIPTION OF EMBODIMENTS OF THE INVENTION

Figure 1:
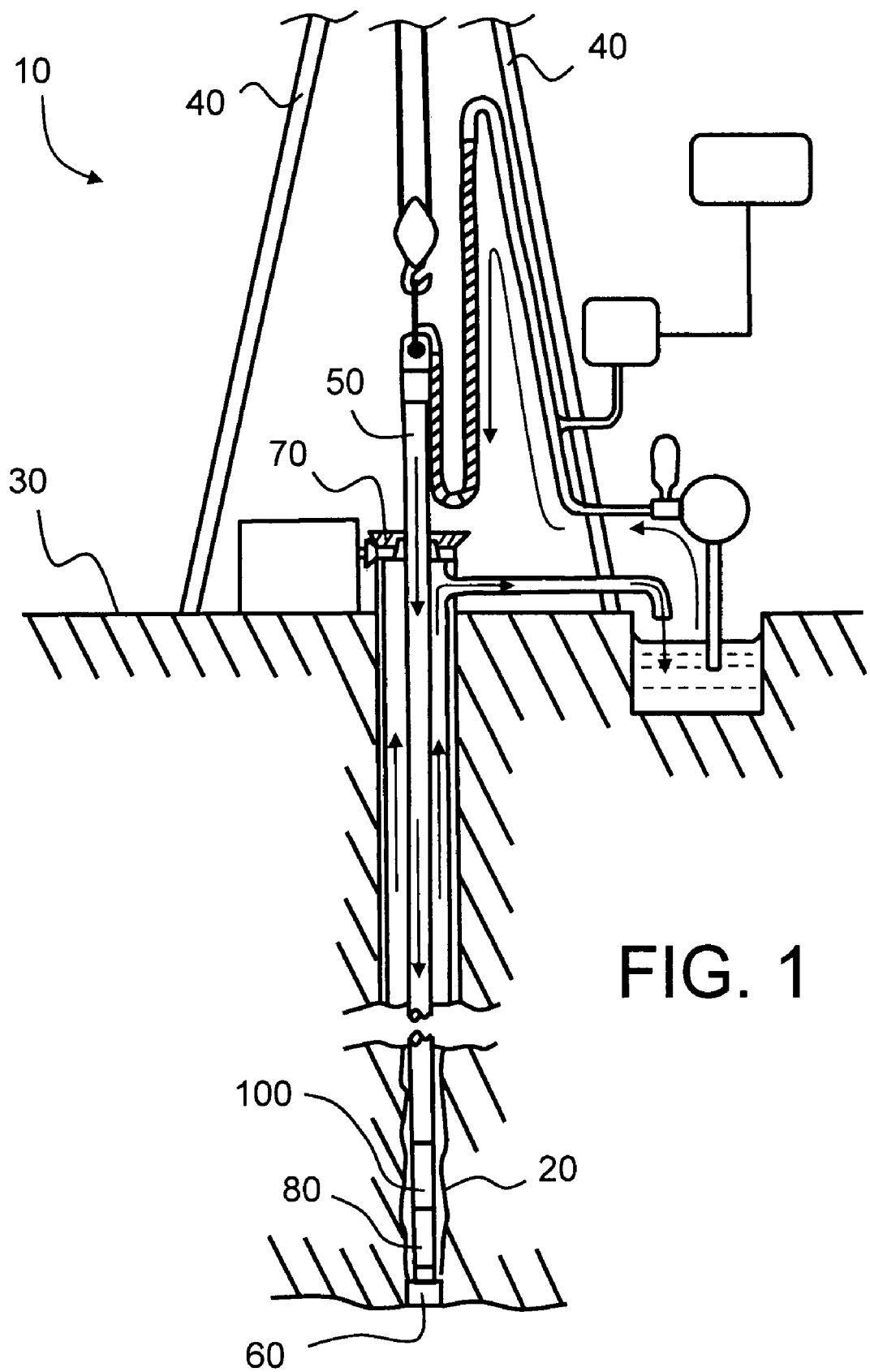
FIG. 1 is a schematic illustration of a drilling rig for use in drilling a borehole into a subterranean region.

In overview the present invention is concerned with acquiring an approximate stratigraphic map, most preferably a 3-dimensional stratigraphic map, of a subterranean region, for example by way of seismic metrology, and iteratively improving an accuracy of the stratigraphic map; the accuracy is improved by using information derived from an offset log generated from one or more sensing instruments included along a drilling pipe employed to drill a borehole through the subterranean region.

Numbers of sections of pipe coupled to form a string of drilling pipes during a process of drilling a borehole are known at various time instances during drilling of the borehole; the overall length of the string of drilling pipes is thereby known. Moreover, by way of one or more inertial navigation units, for example including one or more gyroscopes, included at or near a distal end of the string of drilling pipe in a vicinity of its drill bit enable an angle of the distal end of the string of drilling pipes to be predicted as it passes into the subterranean region. The one or more gyroscopes beneficially include one or more of: fibre-optical gyroscopes (FOG), ring laser gyroscopes (RLGs) or similar instrumentation devices which are relative insensitive to vibration and which provide an angular measurement which is relatively insensitive to temperature variations (or at least compensated in respect thereto) with regard to scale factor and zero bias drift. Temperatures within the borehole can become elevated on account of geothermal heating as well as frictional heat generated during drilling the borehole; for example, operating temperatures of 200° C. are not uncommon.

By computation using the instantaneous length of the string of drilling pipes in combination with the instantaneous angle of the distal end of the string of drilling pipes, a position of the end of the string of drilling pipes within the subterranean region can be determined. By monitoring signals from other sensors, for example:

(a) electrical conductivity sensors for measuring electrical conductivity of liquids generated during drilling; and/or
(b) radioactivity from gamma sensors for measuring porosity of rock through which the borehole has penetrated; and/or
(c) acoustic resonant sensors coupled to fluid present in the borehole, further information, namely various forms of offset log, indicative of the strata through which the drill bit has penetrated can be obtained.

The measured path of the borehole through the subterranean region is thus compared to the stratigraphic mapping determined previously to seismic sensing to compute the path of the string of drilling pipes in respect of true vertical thickness (TVT), or alternatively true stratigraphic thickness (TST), of strata present in the subterranean region. Turning points are then determined where:

(a) the path of the borehole exits back out of a given layer of strata; and
(b) the path of the borehole turns to re-enter a given layer of strata which it has earlier traversed.

Based upon the positions of the turning points, the offset log is subdivided into sections. Beneficially, the section of the offset log is reordered in sequence in response to whether the borehole is exiting a given layer of strata back into a previous layer of strata, or whether the borehole is re-entering a previous layer of strata from which the borehole has exited.

A comparison function, for example a correlation function or neural network function, is then applied, as elucidated in more detail later, to the sections of the offset log expressed in terms of parameters TVT or TST. Conveniently, the parameters TVT or TST expressed as a percentage, namely TVT %-D and TST %-D respectively, and are most beneficially employed as will be elucidated later.

Positions along the offset log at which the offset log is subdivided into sections for comparison purposes, for example for correlation, are then iteratively varied to determine whether or not a better correlation can be obtained. If the correlation is susceptible to being improved during such iterative adjustment of the positions for subdividing, such improvement is indicative that the stratigraphic mapping from which the parameters TVT or TST, alternatively TVT %-D or TST %-D, were derived was not optimally accurate. Next, the stratigraphic map is updated in response to optimal positions of the turning points which provided a best comparison, for example a best correlation, and recomputation of TVT or TST, alternatively TVT %-D or TST %-D, is then executed until the comparison, for example correlation, is not susceptible to being further improved.

The computation as elucidated in overview above is susceptible to being repeated for multiple boreholes drilled, or being drilled, into the subterranean region.

Embodiments of the invention will now be described to further elucidate the aforesaid overview.

In FIG. 1, there is shown a schematic illustration of a drilling apparatus indicated generally by 10, and a borehole 20 drilled into the Earth by the drilling apparatus 10 in search of oil and gas. The borehole 20 is drilled using contemporary drilling methods including directional drilling techniques. A drilling rig 40 of the drilling apparatus 10 is located on a surface of the Earth, or alternatively on an offshore platform anchored to a seabed region. A string of drill pipe 50 extends from the drilling rig 40 into the borehole 20. At a distal down-hole end of the string of drill pipe 50 is a diamond-tipped drill bit 60. A rotary table 70 of the rig 40 is operable to rotate the entire string of drill pipe 50. Such rotary action, simultaneously with applying weight to the string of drill pipe 50 and thereby onto the drill bit 60, results in drilling action which extends the borehole 20 through the Earth. Drilling mud is circulated as illustrated by arrows downward through an interior region of the string of drill pipe 50. The drilling mud exits from the string of drill pipe 50 in a vicinity of the drill bit 60; the drilling mud removes drilling debris and cools the drill bit 60. The drilling mud returns along a region of the borehole 20 exterior to the string of drill pipe 50 back to the drilling rig 40 for subsequent recirculation. Such recirculation of the drilling mud reduces an environmental impact of operation of the drilling apparatus 10.

As the drill bit 60 cuts into the Earth, the string of the drill pipe 50 is lengthened by adding sections of drill pipe to the up-hole end of the string of drill pipe 50. The length of each section is known and thereby allows the overall length of the string of drill pipe 50 to be thereby known by counting a number of such sections of drill pipe that are coupled together to construct the string 50.

Initially, the rig 40 applies a rotating force to the drill bit 60 to result in drilling the borehole 20 in a substantially vertically downward direction; the rotation force is generated by a mud motor 80 included near the distal end of the string 50. Subsequently, to drill the borehole 20 in a more horizontal direction, the drill bit 60 is angularly rotated by using a bent sub connecting the motor 80 and the drill bit 60 to the string 50. The use of the bent sub causes a path of the borehole 20 to curve from its initially substantially downwards direction. The direction in which the borehole 20 is cut is controlled by adjusting an angular orientation of the bent sub, and also by weight applied onto the drill bit 60.

For example, when drilling the borehole 20 to tap into a stratigraphic zone located thousands of meters below the Earth's surface, the borehole 20 is initially drilled in a substantially downward direction, namely substantially vertically downwards. The rotary table 70 is used to rotate the string of pipe 50 during this initial phase of drilling. When the borehole 20 approaches near to the zone, the mud motor 80 is used to change the direction of the borehole from a downward direction to a substantially horizontal direction. As the borehole 20 is subsequently drilled to extend it further, changes in direction of the borehole 20 can be made using the mud motor 80. In certain situations, it is desirable to drill the borehole 20 in an upward direction, in a downward direction or even in a sideways direction.

The present invention is concerned with a borehole, for example the borehole 20, drilled using aforementioned directional drilling techniques. Moreover, the present invention relates to maneuvering the borehole 20 accurately to the target zone which, at the outset of drilling the borehole 20, is often an imprecisely known spatial target. The present invention enables information collated during drilling the borehole 20 to more clearly define a spatial position of the target zone to ensure that the drill bit 60 drills precisely into the target zone.

The string 50 includes instrumentation towards the distal end thereof; for example, the instrumentation is denoted by 100. Conveniently, the instrumentation 100 includes a navigation unit including one or more gyroscopes as elucidated in the foregoing. Moreover, the instrumentation 100 also includes a radioactive gamma sensor for generating an offset gamma ray log indicative of porosity of strata through which the drill bit 60 has penetrated. Optionally, the instrumentation 100 includes other types of sensor, for example acoustic sensors, for determining characteristics of the mud and other fluids being swept away from the drill bit 60. Data from the instrumentation 100 is conveniently conveyed back to the rig 40 by way of digital pressure pulses transmitted through the mud circulating between the rig 40 and the drill bit 60; other techniques for telemetry of such data may additionally or alternatively be employed.

Figure 2:
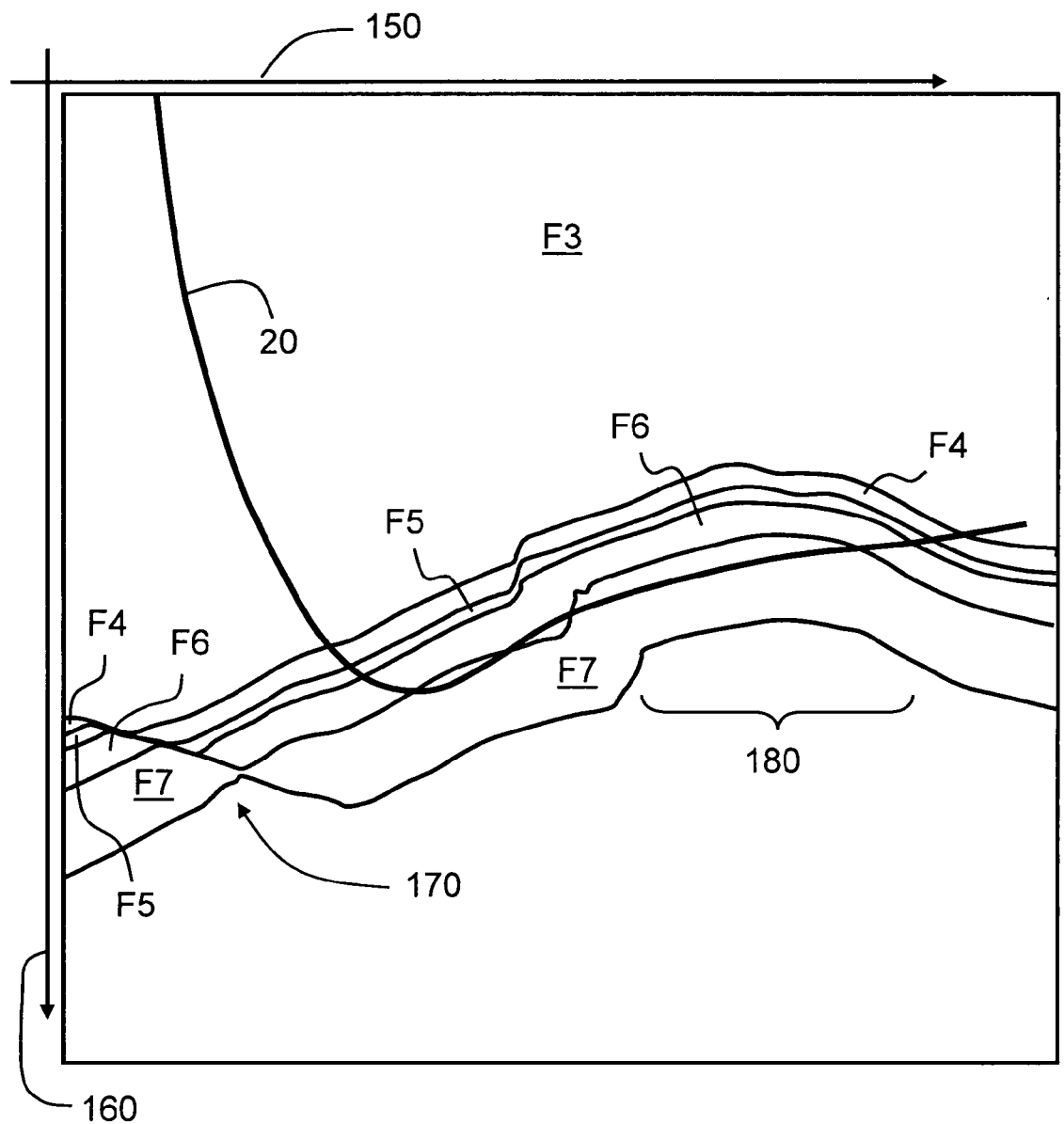
FIG. 2 is a graph illustrating penetration of the borehole of FIG. 1 through the subterranean region, the borehole having an initially substantially vertical downward trajectory and then subsequently bending to assume finally a substantially horizontal trajectory.

Referring to FIG. 2, a path of the borehole 20 through a subterranean region is shown. An abscissa axis 150 denotes a lateral distance from a spatial location whereat the borehole 20 penetrates into the Earth's surface 30. Moreover, an ordinate axis 160 denotes a vertical distance into the Earth into which the borehole 20 penetrates. The borehole 20 is shown by a curve denoted by a thick black line which has an initial substantially vertical orientation but reaches a maximum depth and then continues horizontally in a gently upwardly inclined direction. The length of the curve is representative of the string of drilling pipes 50. As shown, the subterranean region includes several layers of strata denoted from top to bottom by F3 to F7, the strata layer F3 being a layer nearest the Earth's surface 30 and the strata layer F7 being a layer most remote therefrom.

It will be observed from FIG. 2 that faulting has occurred in the subterranean region as indicated by 170. Moreover, the layers of strata F4 to F7 form a capture zone in which oil and gas, being lighter than water, have a tendency to percolate over a period of many millions of years to form an oil and/or reservoir thereat. It is this reservoir that represents the target zone that the borehole 20 is steered during drilling to intercept. For example, in an event that the strata layer F4 is substantially impermeable to oil and gas, a reservoir of oil or gas collects in the region denoted by 180 in one or more of the strata layers F5 to F7. On account of the layers F4 to F6 being relative dense and impermeable, they are also difficult to drill through. It is thus highly desirable to drill the borehole 20 substantially orthogonal to the layers F4 to F6 and then follow the softer layer F7 to the reservoir formed within the region 180. Direction drilling as elucidated in the foregoing enables such a complex path for the borehole 20 to be realized in practice. In geological terminology, FIG. 2 represents a well borehole trajectory crossing an anticline structure.

In order to elucidate the present invention, various parameters will be employed as defined in Table 1.

TABLE 1

Definition of parameters

| Parameter | Definition of the parameter |
| --- | --- |
| TVT | True Vertical Thickness of a stratigraphic interval traversed by the borehole 20 |
| TST | True Stratigraphic Thickness of a stratigraphic interval traversed by the borehole 20 |
| TVT % | Percentage of the True Vertical Thickness interval traversed along the borehole 20 |
| TST % | Percentage of the True Stratigraphic Thickness interval traversed along the borehole 20 |
| TVT-D | True Vertical Thickness Depth, namely accumulated vertical thickness along the borehole 20 |
| TST-D | True Stratigraphic Thickness Depth, namely accumulated stratigraphic thickness along the borehole 20 |
| TVT %-D | True Vertical Thickness Percentage Depth, namely accumulated percentage of interval crossed along the borehole 20 |
| TST %-D | True Stratigraphic Thickness Percentage Depth, namely accumulated percentage of interval crossed along the borehole 20 |

Figure 3:
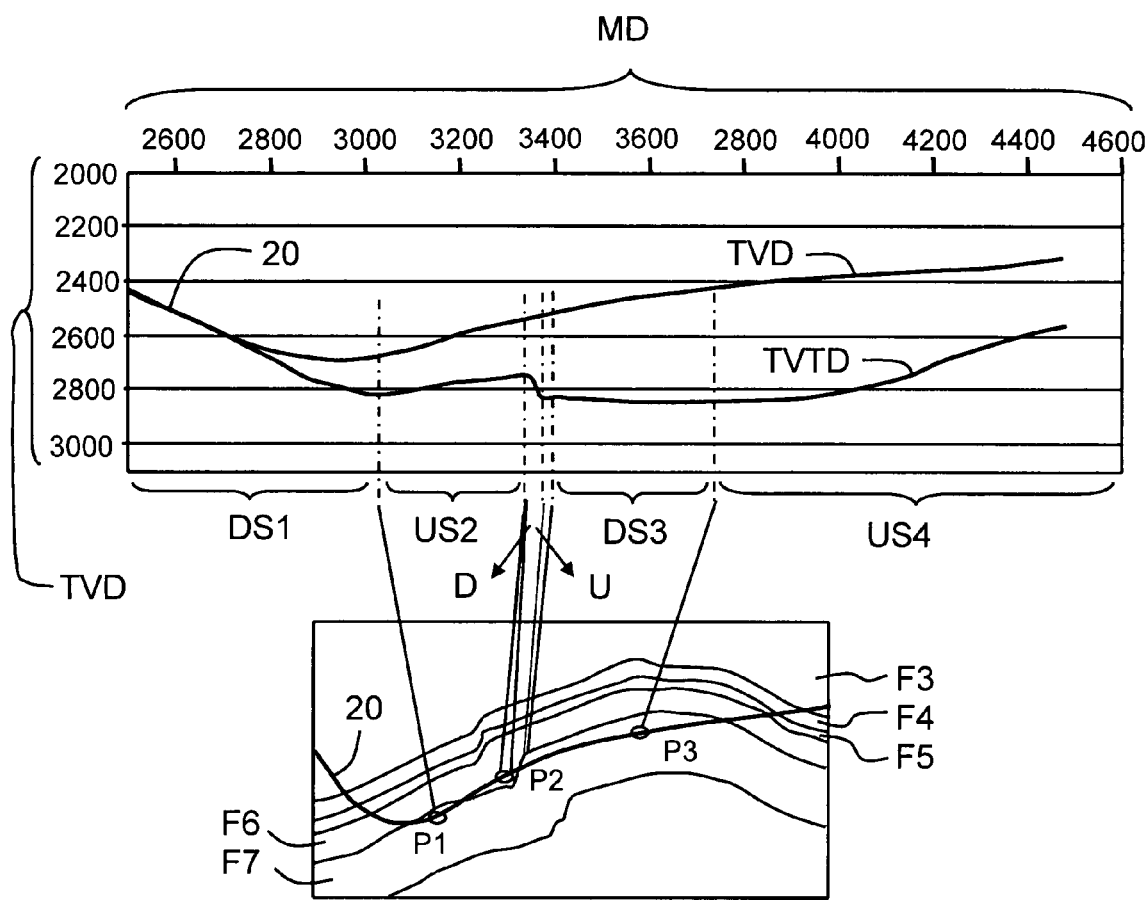
FIG. 3 is a graph illustrating measured depth of the borehole in comparison to true vertical depth (TVD) of the borehole.

Referring next to FIG. 3, the borehole 20 is shown with reference to an abscissa axis denoted by MD which is an abbreviation for Measured Depth along borehole 20, and an ordinate axis denoted by TVD which represents a True Vertical Depth of the borehole 20. Two curves are shown to represent the borehole 20 wherein:

(a) TVD denotes "True Vertical Depth" of the borehole 20 vertically into the Earth; and (b) TVT-D denotes a penetration of the borehole 20 into each layer of strata of the subterranean region.

The TVT-D curve is especially informative to a geologist in that it is indicative of how the borehole 20 traverses interfaces between various layers of strata F in the subterranean region. For example, in a first downward section denoted by DS1, the borehole penetrates downwardly through the layers of strata F3 to F7. In a second upward section denoted by US2, the borehole 20 traverses back from a point P1 into the strata layer F6; it reaches a greatest extend in the strata layer F6 just preceding a fault line as denoted by a point P2 and then progresses back towards the strata layer F7 as denoted by a downward section DS3. A complex local transition occurs as denoted by D and U denoting Down and Up respectively. Finally, the borehole 20 progresses to reach a given depth into the strata layer F7 at a point P3 before finally as denoted by an upward section US4 progresses back into the strata layer F5, then into the strata layer F4 and finally into the strata layer F3. The turning points P1 to P3 of the trajectory of the borehole 20 in relation to the layers of strata F3 to F7 is important for purposes of fully appreciating the offset log generated by the instrumentation 100 as will be elucidated in more detail later. The turning points P1 to P3 are shown in FIG. 3 as circles included on the lower graph shown.

Figure 4:
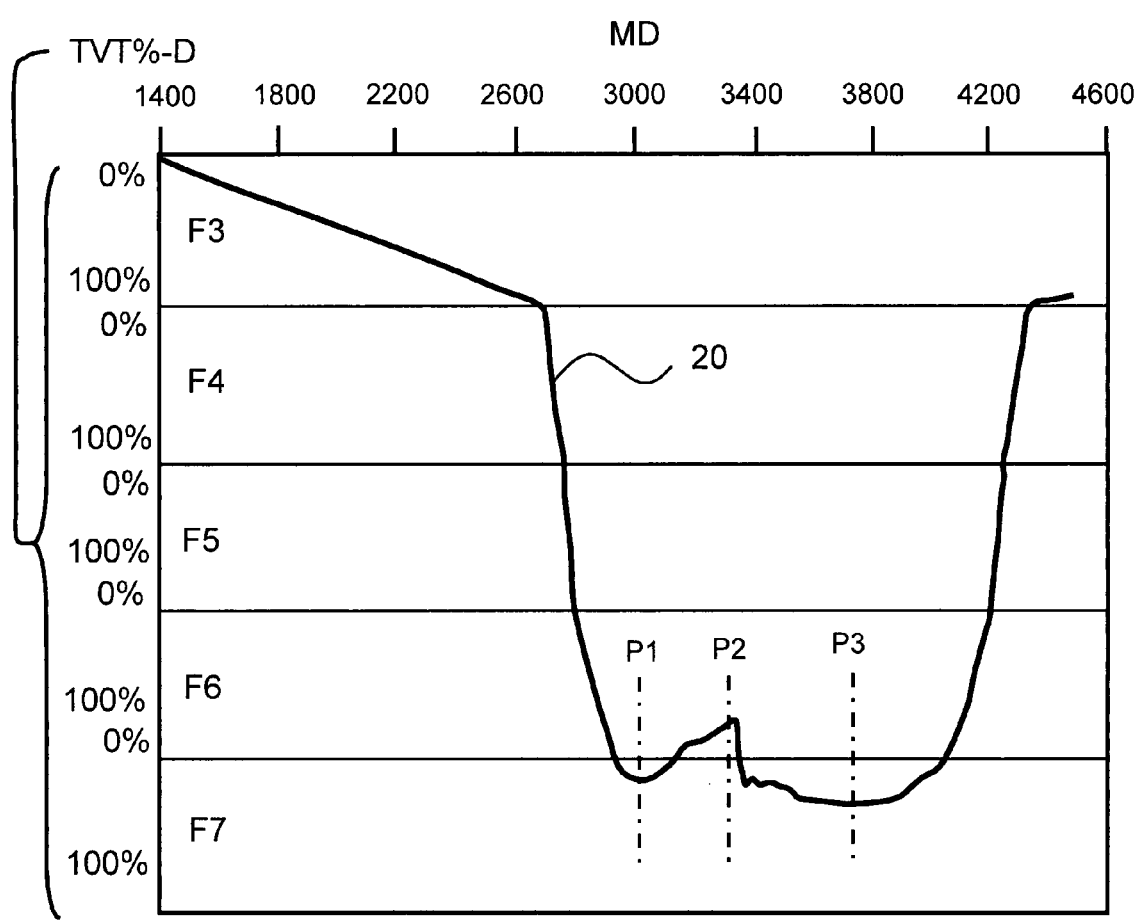
FIG. 4 is a graph similar to that of FIG. 3 except that the trajectory of the borehole is plotted in respect of a parameter "true vertical thickness percentage depth" (TVT %-D)
Figure 5:
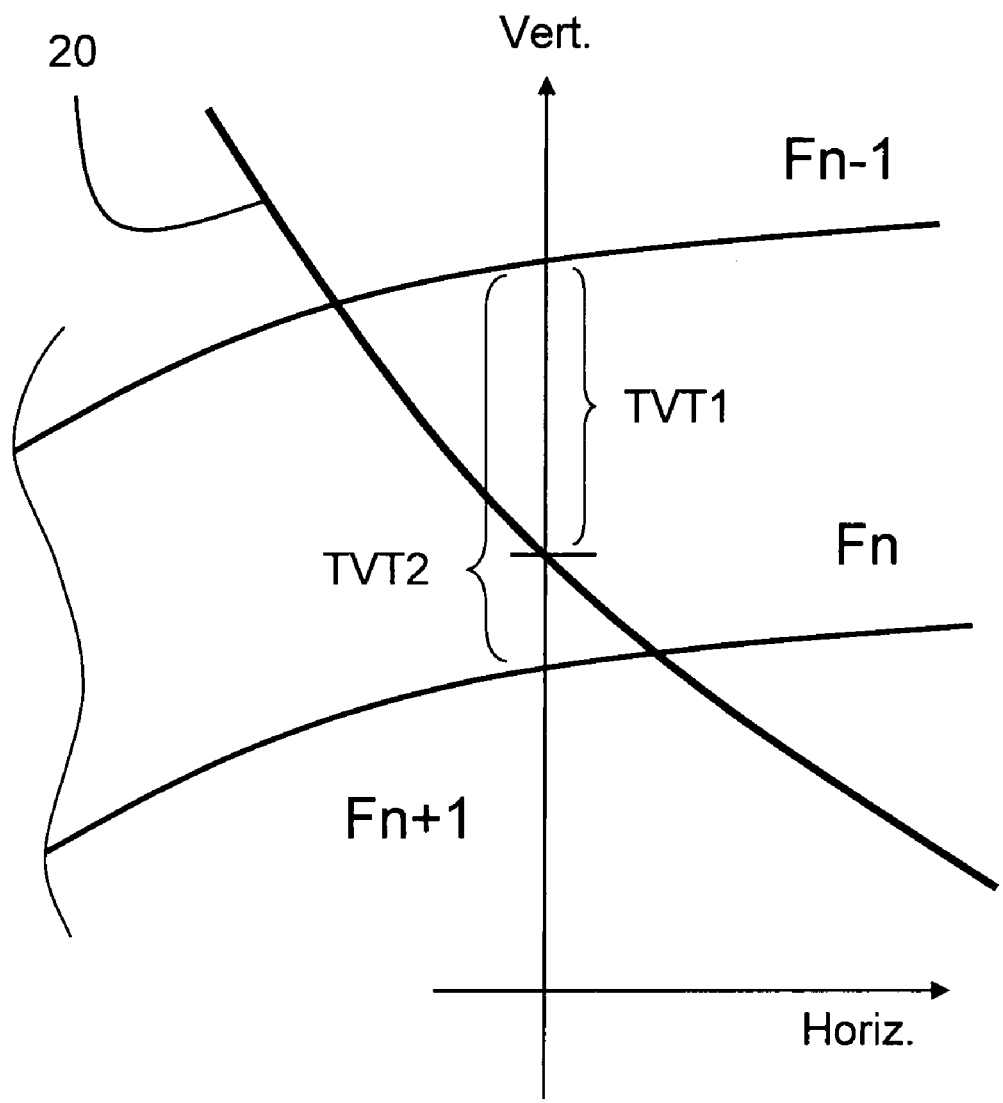
FIG. 5 is a sketch diagram for defining derivation of the parameter TVT %-D.

Referring next to FIG. 4, plotting the depth of the borehole 20 as a function of measured depth MD along an abscissa axis, alternatively as a function of an offset distance from a point at which the borehole 20 penetrates the Earth, and TVT %-D along an ordinate axis is especially effective at identifying clearly the turning points P1 to P3 as shown. In order to derive the TVT %-D data shown, a simple percentage calculation as illustrated in FIG. 5 is performed as defined by Equations 1a, 1b (Eqs. 1a, 1b):

$$(TVT\% - D) = \frac{TVT1}{TVT2} \times 100\% \qquad \text{Eq. 1a}$$

wherein TVT %-D can be normalized to be used as a domain onto which borehole trajectory data can be projected pursuant to $$(TVT\% - D) = \frac{TVT1}{TVT2} \times Zone_{index} \qquad \text{Eq. 1b}$$

and wherein a zone index $Zone_{index}$ is defined as an integer number increasing from shallower zones, namely shallower layers of strata relative to the surface, to deeper zones, namely deeper layers of strata relative to the surface 30.

Figure 6:
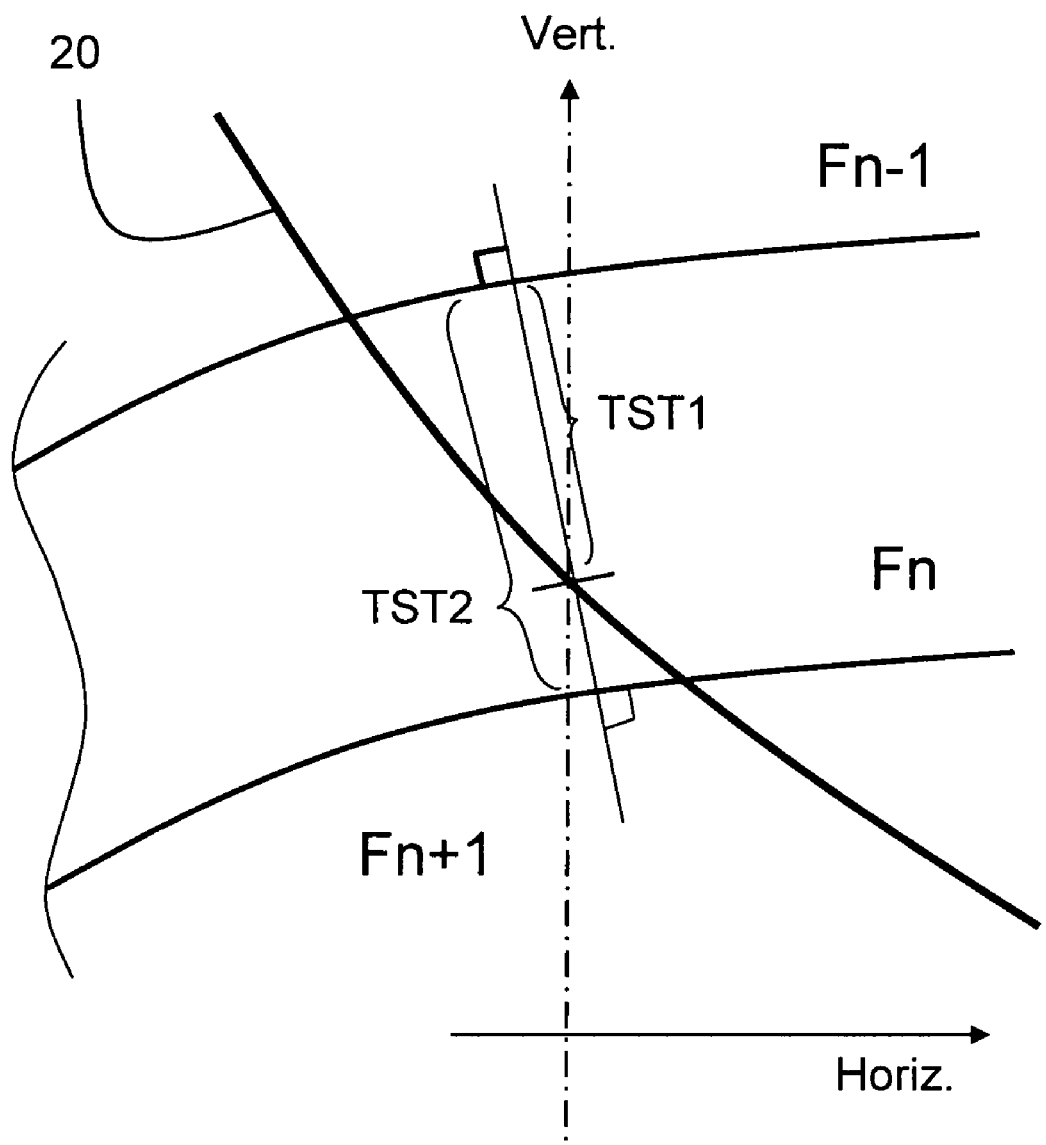
FIG. 6 is a sketch diagram for defining derivation of an alternative parameter "true stratigraphic thickness percentage depth" (TST %-D)

Generally similar results to those shown on FIG. 4 are obtained when plotting the depth of the borehole 20 as a function of measured depth MB of the borehole 20 along an abscissa axis, alternatively as a function of an offset distance from a point at which the borehole 20 penetrates the Earth, and TST %-D along an ordinate axis; such plotting is also especially effective at identifying clearly the aforesaid turning points P1 to P3. In order to derive the TST %-D data for such plotting, a simple percentage calculation as illustrated in FIG. 6 is performed as defined by Equations 21, 2b (Eqs. 2a, 2b):

$$(TST\% - D) = \frac{TST1}{TST2} \times 100\% \qquad \text{Eq. 2a}$$

wherein, in a similar manner to the foregoing the TST %-D can be normalized to be used as a domain to project trajectory data pursuant to $$(TST\% - D) = \frac{TST1}{TST2} \times Zone_{index}, \qquad \text{Eq. 2b}$$

and wherein a zone index $Zone_{index}$ is defined as an integer number increasing from shallower zones, namely shallower layers of strata in respect of the surface 30, to deeper zones, namely deeper layers of strata relative to the surface 30.

Figure 7:
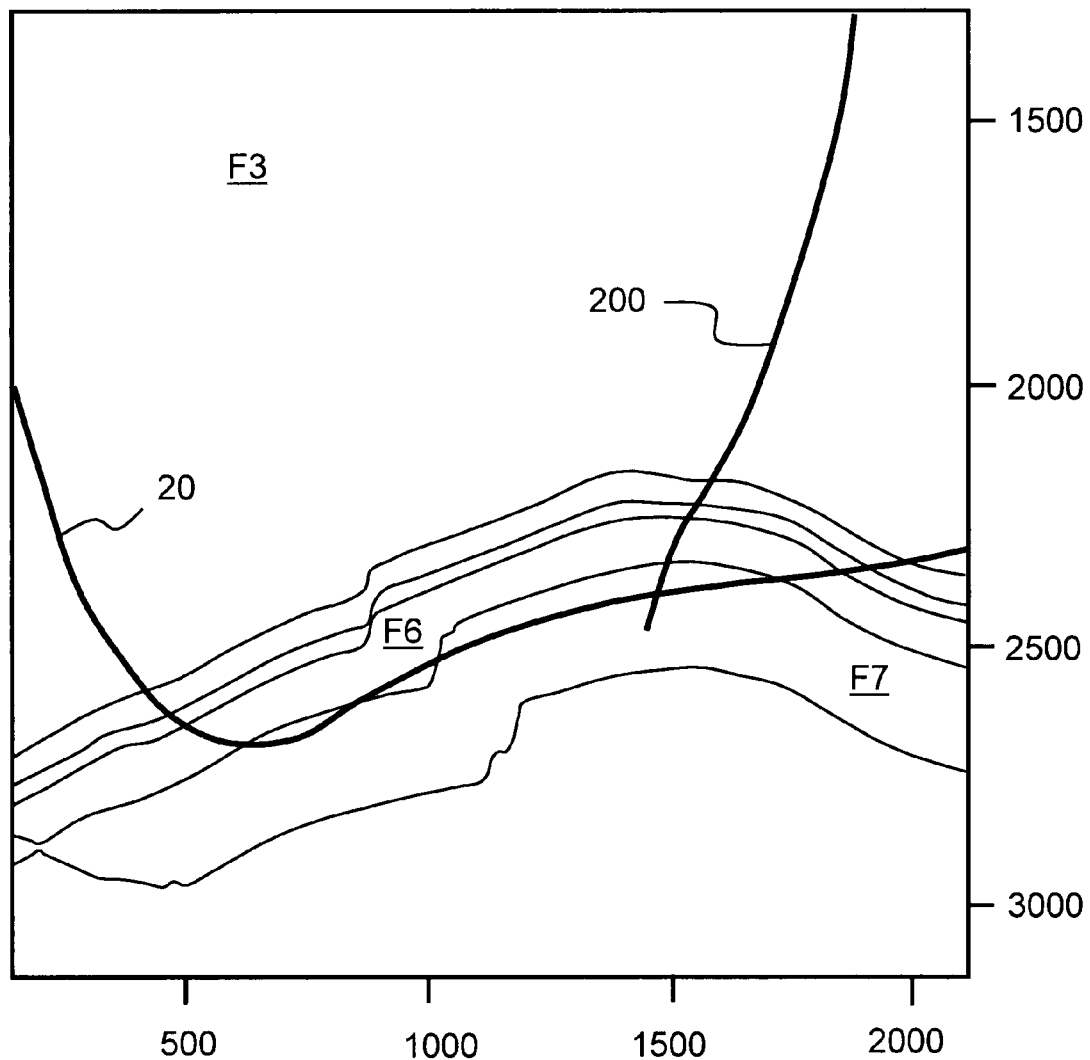
FIG. 7 is a trajectory plot for two boreholes into the subterranean region.
Figure 8:
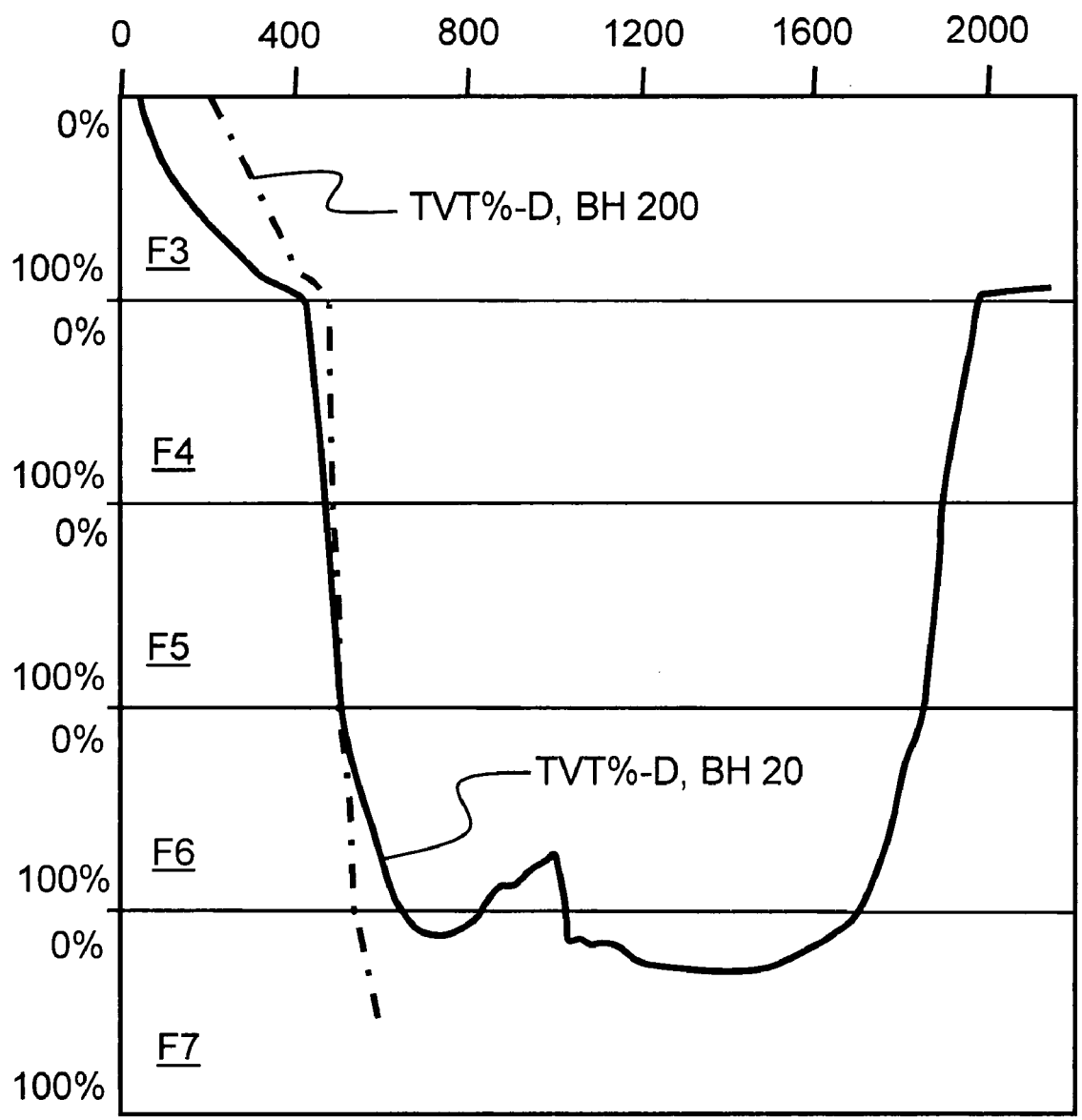
FIG. 8 is a trajectory plot in respect of the aforesaid parameter TVT %-D for the two boreholes of FIG. 7.

As will be elucidated in more detail later, reliable computation of the turning points P, for example the points P1 to P3 for the example provided here, is important when performing comparison, for example by correlation, to improve the stratigraphic map of the subterranean region. It is also desirable in this respect to compare, for example to correlate, results from a given borehole, as well as mutually correlating results from more than one borehole to improve stratigraphic map accuracy. For example, in FIG. 7, there is shown a stratigraphic map having an abscissa axis representing lateral offset distance, and an ordinate axis representing vertical depth of two boreholes 20, 200; the borehole 20 has been shown previously. The borehole 200 reaches the strata layer F7 via a more direct path than that of the borehole 20, but nevertheless also penetrates through the layers of strata F3 to F6 to reach the layer F7. In FIG. 8, trajectories for the two boreholes 20, 200 (BH 20, BH 200) are shown superimposed as a function of the parameter TVT %-D; it will be seen from FIG. 8 that a the trajectories shown in terms of the parameter TVT %-D are relatively similar until the borehole 20 turns to assume a substantially horizontal inclination. In FIG. 8, an abscissa axis corresponds to lateral distance of the boreholes 20, 200, whereas an ordinate axis denotes TVR %-D defined as 0% to 100% in a manner as defined in Equations 1a, 1b (Eqs. 1a, 1b) in the foregoing.

Figure 9:
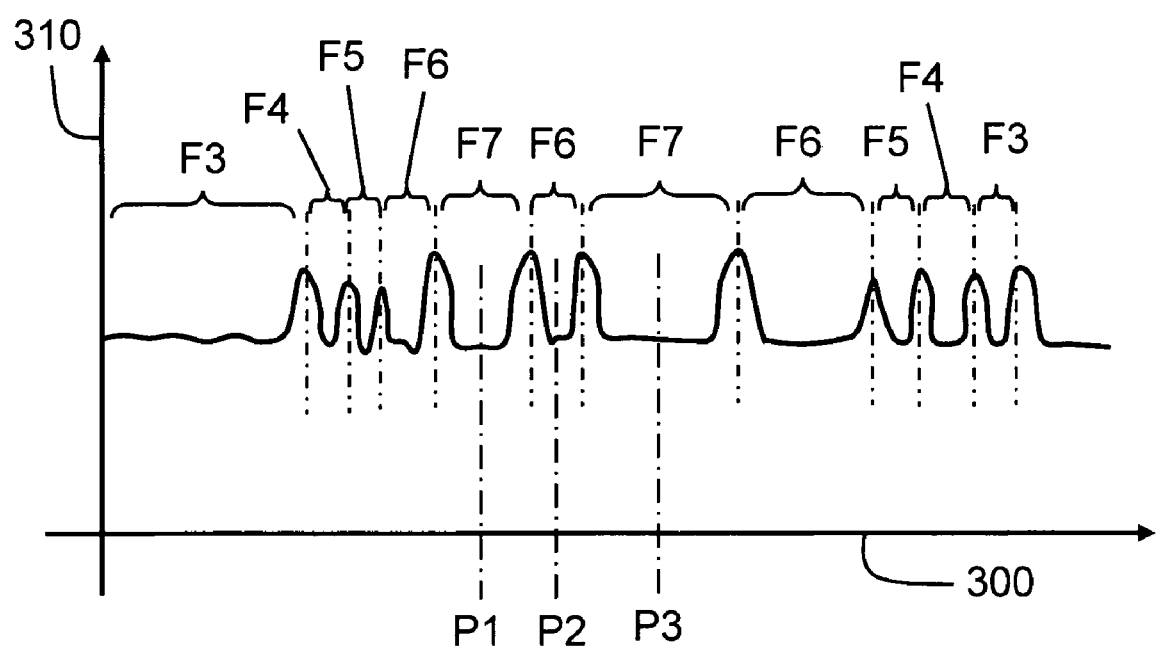
FIG. 9 is an illustration of an example offset log for the borehole of FIG. 2.

Comparison, for example by correlation, neural networks or similar, of offset logs will now be elucidated. In the FIGS. 2 to 8, spatial penetration of the borehole 20 into various strata is shown in various presentation formats. Associated with the trajectory of the borehole 20, similarly the borehole 200, is an offset log generated by the instrumentation 100. FIG. 9 is an illustration of an offset log as a function of the distance along the borehole 20; the log is merely to illustrate the present invention and is not necessarily representative of actual experimental data. In FIG. 9 there is shown a graph with an abscissa axis denoting distance along the borehole 20, and with an ordinate axis denoting measured offset signal, for example gamma signal or similar sensed signal generated by the instrumentation 100. It will be observed that characteristic parts of the log repeat themselves as the borehole 20 exits and returns again to various layers of strata. Moreover, characteristic parts of the log are mutually a mirror image of one another depending upon whether or not the borehole 20 is entering or leaving a given layer of strata; for example, a section of the log from P1 to P2 is a mirror image of a section of the log from P2 to P3, albeit with a difference in scaling factor along the abscissa axis.

Figure 10:
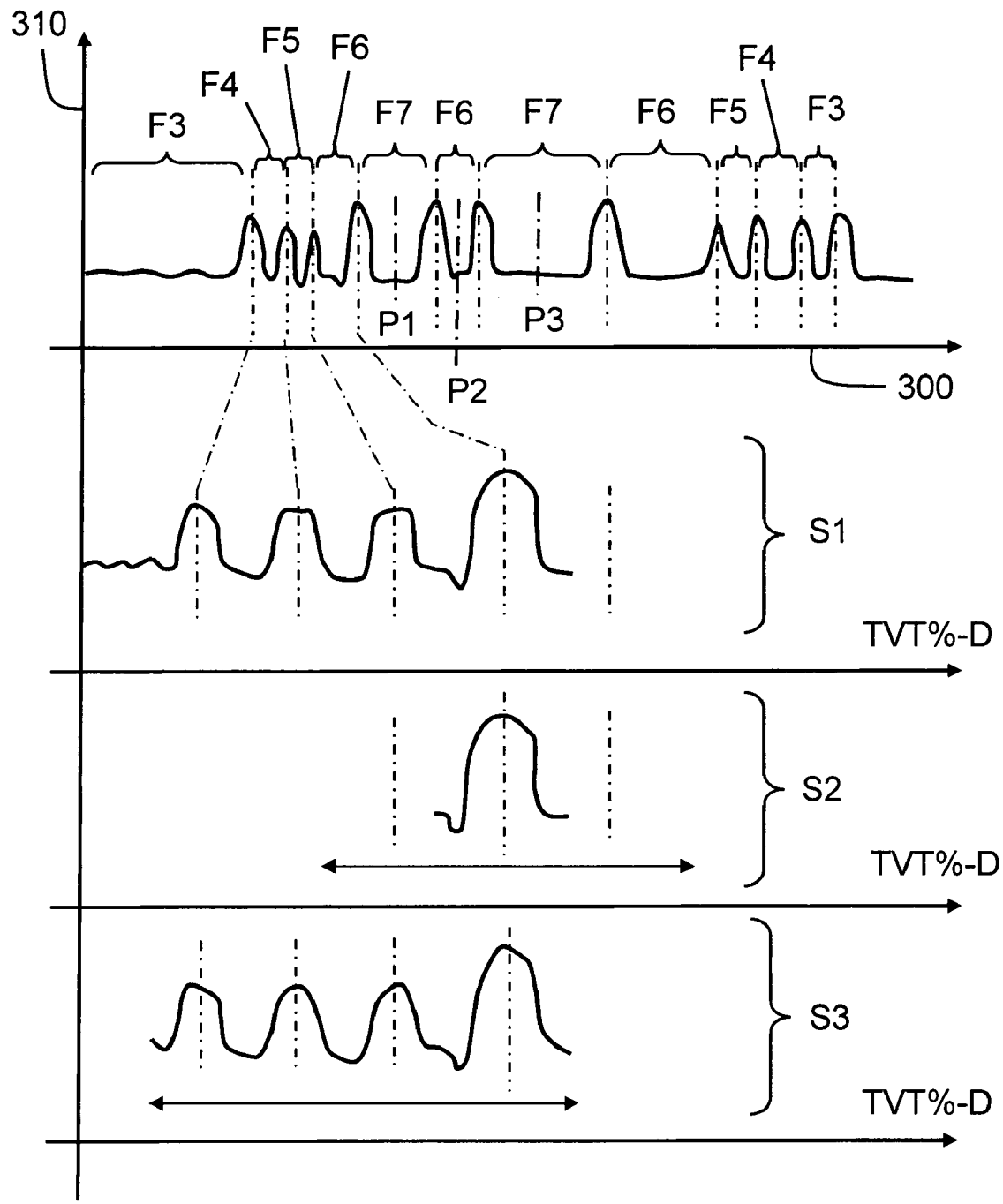
FIG. 10 is an example of the offset log being partitioned for comparison purposes, for example by correlation, neural network comparison or similar comparison process.

In order to implement the present invention, the abscissa axis of FIG. 9 is preferably expressed in TVT %-D, or alternatively TST %-D, in order to normalize scale of the offset log for the respective layers of strata F3 to F7; such a scaling transformation is illustrated in FIG. 10. The log shown in FIG. 9 expressed in terms of TVT %-D in FIG. 10 is then cut into sections S1, S2 and S3 based on the points P1 to P3 which are determined from the geological map of the subterranean region. The section S2 is then reversed in response to the borehole 20 exiting back into an earlier layer of strata, namely from the layer F7 to the layer F6 to cause the section of log from P1 to P2 to be expressed in reverse order as illustrated in FIG. 10.

Although 2-dimensional representations are provided in accompanying drawings, it will be appreciated that geological maps are in practice when implementing the present invention representative of 3-dimensional volumes. All parameters provided in Table 1 are beneficially computed in respect of a 3-dimensional volume. A method for implementing the present invention is beneficially repeated for purpose of comparison until a satisfactory degree, for example by performing correlations, of similarity is obtained as will be elucidated below.

If the stratigraphic map of the subterranean region is not accurate, the points P1 to P3 are potentially inaccurate which results in the sections S1 to S3 being shifted relatively to one another. By comparing the sections S1 to S3 together, for example by conventional correlation involving multiplication of corresponding data point values to generate product terms and then summing the product terms to generate a correlation indicative factor, a degree of mutual correlation therebetween is derived; in otherwise a degree of similarity is computed. The relative offsets of the sections S1 to S3 along the TVT %-D abscissa axis are iteratively adjusted so as to obtain a best mutual correlation between the sections S1 to S3. The offsets are indicative of an error in the stratigraphic map used to define the point P1 to P3.

Iteratively, the stratigraphic map is adjusted and then a computation repeated to regenerate the points P1 to P3 and thereby an updated plot in a manner of FIG. 10 and offset determined for obtaining a best new correlation. The computation process is repeated until the correlation of the sections S1 to S3 cannot be improved. Optionally, correlation from both the borehole 20 and the borehole 200 are used obtain a best correlation. In such case of optimized correlation, the stratigraphic map is as accurate as sensed signals from the instrumentation 100 allow.

Figure 11:
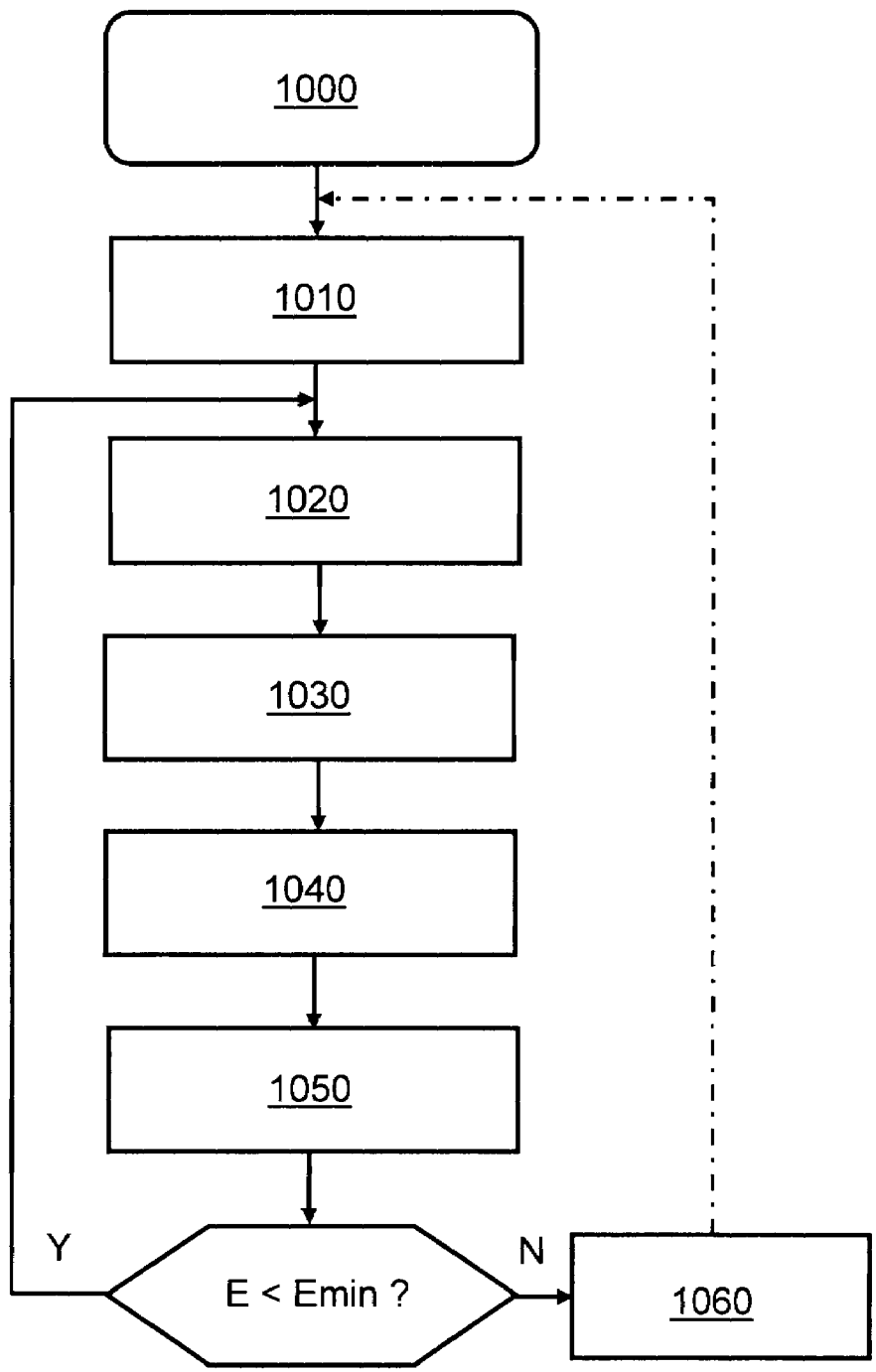
FIG. 11 is a simple flowchart for iterative improvement of a stratigraphic map of the subterranean region shown, for example, in FIG. 2

In FIG. 11, an outline of the aforesaid iterative method is illustrated. In a first step 1000 of the method, an approximate stratigraphic map of the subterranean region is obtained using seismic sensing. Next, in a second step 1010, an offset log of the trajectory of the borehole 20 is either initially created, or updated if already created; the offset log includes inertial sensing of at least an angular orientation of the drill bit 60. Thereafter, in a third step 1020, a plot of the trajectory of the borehole 20 is computed and beneficially expressed as a function of the parameter TVT %-D, alternatively as a function of the parameter TST %-D; turning points of the trajectory within one or more given layers of strata are then determined, for example in a manner akin to the points P1 to P3. Next, in a fourth step 1030, the offset log is divided into log sections, with appropriate reversal if required depending on a direction in which the borehole trajectory enters into a given layer of strata. Thereafter, in a fifth step 1040, a comparison is performed, for example by way of correlation or neural network or similar, of the log sections; the relative positions of the log sections are varied in order to obtain a best comparison, for example a best correlation; relative positions of the log sections giving rise to best comparison are then assumed to be error terms E. Next, in a sixth step 1050, the stratigraphic map is updated using the error terms from the fifth step 1040 to generate an updated stratigraphic map. The method then returns to the third step 1020 to recalculate the error terms in an iterative manner until the error terms E have a minimum value which cannot be improved by iteration. The method then exits to a seventh step 1060 wherein the drill bit 60 is steered for continuing drilling based upon the updated stratigraphic map associated with iteratively minimized error E. Return is subsequently made to the second step 1010 as the trajectory of the borehole 20 is progressively extended by drilling.

Thus, when the stratigraphic map has been updated by the aforesaid method, a decision is then taken in the step 1060, either automatically by computer control or by human intervention, to steer the drill bit 60 so that it more precisely progresses towards a desired target zone within the subterranean region. The invention relies on the instrumentation 100 providing more accurate data than seismic mapping of the subterranean region allow. However, it must be appreciated that the instrumentation 100 is also prone to inaccuracies; for example, a cone of error associated with inertial sensors, namely one or more gyroscopes, in the instrumentation 100 increase with length of the borehole 20.

The present invention is most accurate when applied to update accuracy of a 3-dimensional geological map. It is often a contemporary situation that a borehole trajectory changes from substantially vertical to substantially horizontal to define a vertical plane, and then is drilled to progress out of such a plane. Thus, the present invention pertains primarily to 3-dimensional geological maps and methods to improve their accuracy.

The present invention is thus concerned with a technical problem of accuracy of drilling a borehole into subterranean regions comprising layers of strata. Moreover, the present invention addresses the technical problem by suitable processing instrumentation signals obtained during drilling using computing hardware to provide a control signal for guiding a drill bit using for executing drilling of the borehole. Thus, the present invention relates to a concrete technical problem and is not a mere abstract concept. Signal processing techniques have previously shown themselves to represent patentable subject matter as in European Patent Office technical board decision T208/84 (Vicom).

It will be appreciated that the invention is elucidated in the foregoing in respect of 2-dimensional representations in the FIGS. 2 to 10; however, the present invention is most relevant for 3-dimensional representations and should be construed to pertain, for example, to 3-dimensional geological maps. However, the invention is also equally applicable to 3-dimensional representations. For example, the aforesaid subterranean map and the layers of strata F3 to F7 have 3-dimensional extent for purposes of computation executed to implement the invention.

The present invention is beneficially implemented by way of one or more software products executable on computing hardware. The software products can be provided by way of physical data carriers, for example optical disc data carrier, solid state memory, or via a signal, for example download of the one or more software products via a data communication network such as the Internet.

The present invention beneficially provides users with visual presentation of results so that the users can monitor that the one or more software products implementing the present invention are functioning as intended. Accuracy in drilling boreholes is potentially very important, considering that a 10 km long borehole can often take in an order of two months to drill and represent an investment of many tens of millions of dollars (US). In this respect, use of the present invention is susceptible to bringing considerable benefits in oil exploration and potentially avoiding inaccuracies when drilling expensive boreholes.

Embodiments of the invention as described in the foregoing are susceptible to being modified without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

I claim:

1. A method of processing geological data on a processor during drilling of a borehole for improving the accuracy of the geological data, said method including steps:
    (a) determining from instrumentation (100) associated with one or more strings (50) of drilling pipes, one or more spatial trajectories of one or more boreholes (20, 200) in a subterranean region;
    (b) determining from said one or more spatial trajectories, one or more points (P1, P2, P3) with reference to said geological data, where the one or more trajectories change direction in one or more layers of strata (F) of said subterranean region by using a TVT %-D representation or a TST %-D representation for determining positions of said one or more points where said one or more trajectories change direction;
    (c) subdividing, on a processor one or more offset logs generated by said instrumentation (100) in response to said one or more points (P1, P2, P3) to generate corresponding sections of offset log;
    (d) mutually comparing said subdivided sections of offset log to find a condition of best comparison therebetween and thereby generating one or more error terms (E); and
    (e) in response to the one or more error terms (E), updating the geological data to improve its accuracy.

2. A method as claimed in claim 1, including an additional step after step (e) of repeating steps (b) to (e) until the one or more error terms (E) assume a minimum value therefore.

3. A method as claimed in claim 1, wherein step (d) involves computing one or more correlations for determining a best comparison.

4. A method as claimed in claim 1, wherein said one or more offset logs correspond along the trajectories at least one of:
    (f) a gamma sensing log;
    (g) a material sensing log indicative of composition of drilling mud and fragments generated by one or more drill bits during drilling of the one or more boreholes.

5. A method as claimed in claim 1, wherein the geographical data is at least one of a 2-dimensional stratigraphic representation of the subterranean region, and a 3-dimensional stratigraphic representation of the subterranean region.

6. An apparatus (10) operable to implement a method as claimed in claim 1.

7. A software product stored on a data carrier or susceptible to being communicated via a data-carrying signal, said software product being executable on computing hardware for implementing a method as claimed in claim 1.

8. A drilling rig (40) operable to implement a method as claimed in claim 1, said method being operable to improve the accuracy of drilling a borehole with respect to a geological target zone.

* * * * *